May 6, 1924.
G. W. BANDEL ET AL
1,492,624
REAR FENDER GUARD FOR MOTOR CARS
Filed April 2, 1923
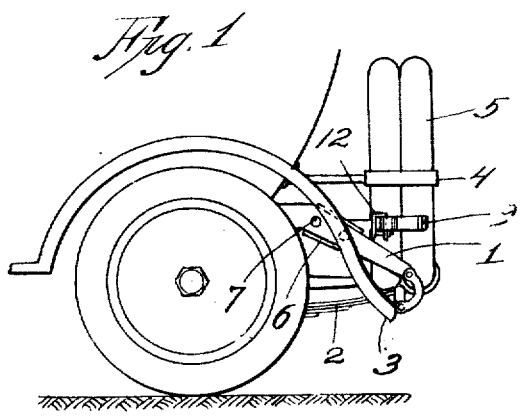
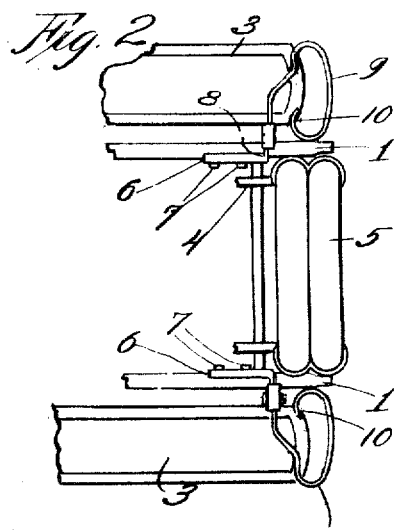
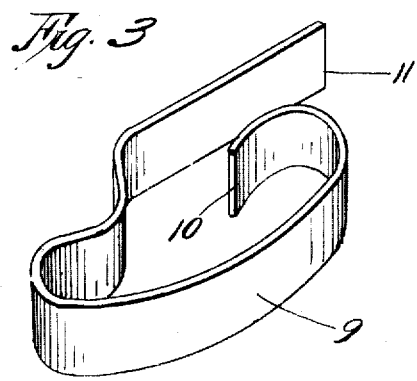
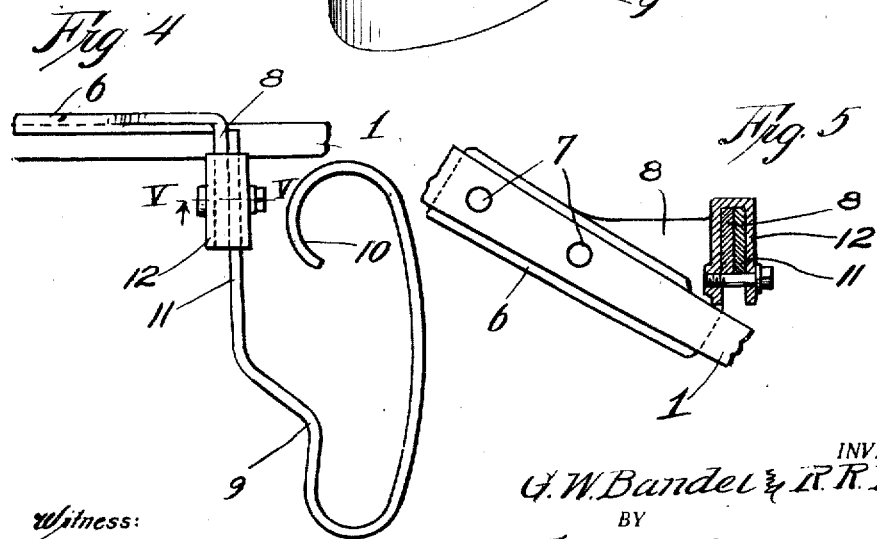
INVENTORS.
G. W. Bandel & R. R. Puett
BY
Thorpe Girard ATTORNEYS.
Witness:
R. C. Hamilton Patented May 6, 1924.

1,492,624

UNITED STATES PATENT OFFICE.

GEORGE W. BANDEL AND ROUBAIX R. PUETT, OF KANSAS CITY, MISSOURI.

REAR-FENDER GUARD FOR MOTOR CARS.

Application filed April 2, 1923. Serial No. 629,457.

*To all whom it may concern:*

Be it known that we, GEORGE W. BANDEL and ROUBAIX R. PUETT, citizens of the United States, and residents of Kansas City, Jackson County, State of Missouri, have invented a certain new and useful Improvement in Rear-Fender Guards for Motor Cars, of which the following is a complete specification.

This invention relates to rear fender guards for automobiles and is particularly adapted for use in protecting the rear end of the fender from damage, when a plurality of tires carried at the rear end of the car project some distance beyond the ends of the fenders, as it has been found that under these conditions, a transverse bumper bar which is formed with arms long enough to embrace the tires is too bulky and unwieldy for satisfactory use. It is to be understood, however, that a guard embodying the invention may be utilized with any type of car and we do not intend to be limited to cars having projecting spare tires.

More particularly our object is to provide a small individual guard for each rear fender for the protection of such fender when parking or attempting to withdraw from a parking space, when the space for maneuvering the car is limited, and also to avoid damage to the fender from the carelessness of the driver of an adjacent car.

Another object is to produce a device of the character mentioned which is of strong, durable, efficient and inexpensive construction; and in order that it may be fully understood, reference is to be had to the accompanying drawing, in which:—

Figure 1 is a side elevation of a portion of the rear end of an automobile equipped with a guard embodying the invention;

Figure 2 is a top plan view of the same with the body of the car omitted;

Figure 3 is a perspective view of one of the guards;

Figure 4 is a top plan view of a portion of the frame of the car and illustrates a guard embodying the invention secured thereto; and Figure 5 is a section on the line V—V of Figure 4.

In the said drawing, where like reference characters identify corresponding parts in all of the figures, 1 represents a rearward extension from the frame of an automobile to form a hanger for the customary supporting spring 2, and 3 the rear fenders of the car which curve downwardly and rearwardly beyond the body of the automobile. Secured transversely of the frame of the car and between the hangers 1 is a spare tire carrier 4 carrying a pair of tires 5 which project rearwardly some distance beyond the ends of the hangers 1, as illustrated. It will be evident, in this connection, that the spare tires 5 will efficiently protect the rear end of the car from accident, should the automobile be backed squarely into an obstruction or another car collide therewith as frequently occurs in congested traffic.

The fenders of the car, however, are of relatively great width and extend downward in such a position that they are frequently bent or damaged through contact with an obstruction when it is attempted to maneuver at an angle in entering or leaving a parking space or other limited area, and it has also been found that the driver of a car parked to the rear will frequently collide with the unprotected fender when he attempts to drive his car out of the parking space.

In order, therefore, to efficiently protect the rear fenders of a car of the character suggested, where it is impracticable to provide a continuous transverse guard, we provide the following guard: 6 indicates a bracket of channel shape of such size as to snugly embrace the inner face of the hanger 1, and said bracket is secured in position by means of suitable bolts 7. Rearwardly extending from the bracket 6 at such an angle as to be substantially parallel with the surface of the roadway is a right-angle shaped arm 8 which overlies the hanger 1 and bridges the space between such hanger and the inner edge of the fender.

Secured to the arm 8 and overlying the fender and projecting rearwardly and outwardly some distance beyond the end of the same is a suitable resilient metal guard 9, which preferably is bent to provide for maximum resiliency, and has its inner end bent inwardly upon itself as at 10 to provide an abutment portion which will yield inwardly and through abutment with the ends of the arm 8 offer further yielding resistance to an obstruction. The straight end 11 of the guard abuts flatly against the rear face of the arm 8 and is adjustably secured in position by the common and well-known type of clamp 12. It will be understood that the parts just described will be duplicated for the right and left hand sides of the automobile, as shown.

From the above description it will be apparent that we have produced a resilient guard embodying the features of advantage set forth as desirable in the statement of the object of the invention, and which may be modified in minor particulars without departing from the principle of construction and mode of operation involved.

What we claim is:

1. The combination in an automobile, of a rear fender, a bracket secured to the frame of the automobile adjacent said rear fender, and a resilient guard extending transversely outwardly as regards the longitudinal center of the car and above the rear end of said fender and carried at one of its ends by said bracket and free at its other end, said free end being bent inwardly and adapted to cooperate with the supported end of the guard in sustaining shock.

2. The combination in an automobile, of a rear fender, a bracket secured to the frame of the automobile adjacent said rear fender, and a resilient guard extending transversely of and above the rear end of said fender and carried at one of its ends by said bracket and terminating at the other end in a coil susceptible of individual cushioning action.

3. The combination in an automobile, of a rear fender, a bracket secured to the frame of the automobile adjacent said rear fender, and a resilient guard extending outwardly as regards the longitudinal center of the car and above the rear end of said fender and carried at one of its ends by said bracket and free at its other end; said free end being bent inwardly toward the longitudinal center of the car and terminating in an inwardly coiled convolution adapted to cooperate with the fixed end of the guard in sustaining shock.

In witness whereof we hereunto affix our signatures.

GEORGE W. BANDEL.
ROUBAIX R. PUETT.